United States Patent [19]

Tsujiuchi et al.

[11] Patent Number: 4,979,225
[45] Date of Patent: Dec. 18, 1990

[54] METHOD AND APPARATUS FOR DETECTING CORRESPONDING REGIONS BETWEEN PICTURE IMAGES

[75] Inventors: Junpei Tsujiuchi, Kawasaki; Shigeto Ikeda, Tokyo; Toshio Honda, Yokohama; Nagaaki Ohyama, Kawasaki; Susumu Kikuchi, Hachioji, all of Japan

[73] Assignee: Olympus Optical Co., Ltd., Tokyo, Japan

[21] Appl. No.: 101,311

[22] Filed: Sep. 25, 1987

[30] Foreign Application Priority Data

Sep. 26, 1986 [JP] Japan ................................ 61-227449
Jun. 11, 1987 [JP] Japan ................................ 62-145528

[51] Int. Cl.$^5$ ............................................. G06K 9/46
[52] U.S. Cl. ........................................ 382/17; 382/18
[58] Field of Search ...................... 364/526; 382/1, 17, 382/18, 41, 48, 49, 51, 52; 358/27, 28, 29, 29 C, 80, 98

[56] References Cited

U.S. PATENT DOCUMENTS

| 4,314,274 | 2/1982 | Atoji et al. | 358/80 |
| 4,414,635 | 11/1983 | Gast et al. | 364/526 |
| 4,621,284 | 11/1986 | Nishioka et al. | 358/98 |
| 4,658,429 | 4/1987 | Orita et al. | 382/36 |
| 4,675,704 | 6/1987 | Yamamoto | 358/80 |
| 4,677,465 | 6/1987 | Alkofer | 358/80 |
| 4,764,971 | 8/1988 | Sullivan | 382/41 |

FOREIGN PATENT DOCUMENTS 61-71791 4/1986 Japan .

Primary Examiner—Leo H. Boudreau
Assistant Examiner—Jose L. Couso
Attorney, Agent, or Firm—Armstrong, Nikaido, Marmelstein, Kubovcik & Murray

[57] ABSTRACT

The method for detecting corresponding regions between a plurality of picture images comprises the steps of setting respective operation object regions for a plurality of picture images, calculating a variance of mutual concentration or density distributions in the operation object regions, and detecting the operation object regions which have been set in which the calculated variance value is at a minimum. The apparatus for detecting corresponding regions between picture images comprises a variance calculating member for calculating a variance of mutual concentration or density distributions in the operation object regions of a plurality of picture images, and a corresponding region detecting member for detecting a seat of regions where a variance value calculated by the variance calculating device is at a minimum.

36 Claims, 11 Drawing Sheets $y = \alpha f + \beta h$

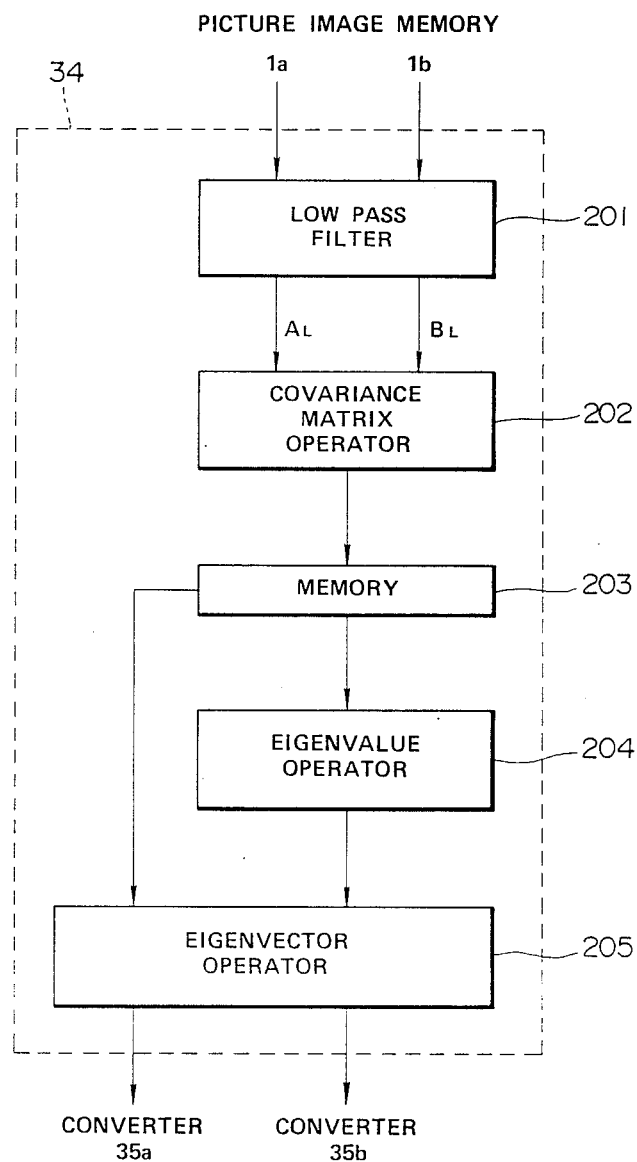

METHOD AND APPARATUS FOR DETECTING CORRESPONDING REGIONS BETWEEN PICTURE IMAGES

FIELD OF THE INVENTION

This invention relates to a method and apparatus for detecting corresponding regions between picture images whereby corresponding regions can be more simply detected between a plurality of picture images.

RELATED ART STATEMENT

The picture image information which can bear various and many informations has recently come to be elevated in the utility in a wide range of fields.

Now, in a multi-dimensional picture image formed of a plurality of thick and thin picture images represented by remote sensing picture images and color picture images, the case correlated with the form distribution in the actual field of each of thick and thin picture images shall be considered. In the case that regions corresponding to each other within these thick and thin picture images and three primary color picture images are to be detected between different picture images, heretofore, for example, a correlating operation has been made to find out a region in which the value is maximum. A phase correlating method mentioned, for example, in the Proceeding ICASSP 86, Vol. 3, 1785-1788 (1986) can be enumerated as such method. In this phase correlating method, in a color picture image formed of three primary colors of red, green and blue, in case the positions of the corresponding picture elements of the respective primary color picture images are displaced, the corresponding region is detected to correct the displacement of the positions.

According to this phase correlating method, it is possible to detect the corresponding region certainly at a high precision. However, in this phase correlating method, the Fourier conversion and reverse Fourier conversion must be made for each of the object regions and the calculation amount is so large that, in order to reduce the processing time, a special large sole circuit is required. There is such practical problem.

OBJECTS AND SUMMARY OF THE INVENTION

An object of the present invention is to provide a method and apparatus for detecting corresponding regions between picture images whereby corresponding regions can be more simply detected between a plurality of picture images.

In the present invention, respective operation object regions are set for a plurality of picture images, the variance of the concentration or density distribution of each other in these operation object regions is calculated and the corresponding region is detected by detecting the set of regions in which the calculated variance value is iminimum.

In case the respective regions in a plurality of picture images are regions corresponding to each other, the variance of the mutual concentration or density distribution will be minimum. Therefore, the corresponding region is detected by detecting the set of regions in which the variance of the mutual concentration or density distribution is minimum.

The other features and advantages of the present invention will become apparent enough with the following explanation.

BRIEF DESCRIPTION OF THE DRAWINGS

FIG. 1 is a formation diagram of a circuit realizing this embodiment.

FIG. 2 is a flow chart showing the process of this embodiment.

FIG. 3 is an explanatory diagram showing the mutual concentration distribution.

FIG. 4 is a functional block diagram showing the formation of a controller.

FIG. 5 is a formation diagram of a circuit realizing this embodiment.

FIG. 6 is an explanatory diagram showing the mutual concentration distribution.

FIG. 8 is a block diagram showing the formation of a principal component analyzer.

FIG. 10 is a formation diagram of a circuit realizing this embodiment.

FIG. 11 is an explanatory diagram showing the mutual concentration distribution.

FIGS. 12 to 14 relate to the sixth embodiment of the present invention.

FIG. 12 is a block diagram of an endoscope apparatus realizing this embodiment.

FIG. 13 is an elevation of a rotary filter.

FIG. 15 is a formation diagram of a circuit realizing this embodiment.

FIG. 16 is an explanatory diagram showing the mutual concentration distribution.

DETAILED DESCRIPTION OF THE PREFERRED EMBODIMENTS:

FIGS. 1 to 4 show the first embodiment of the present invention.

Figure 1:
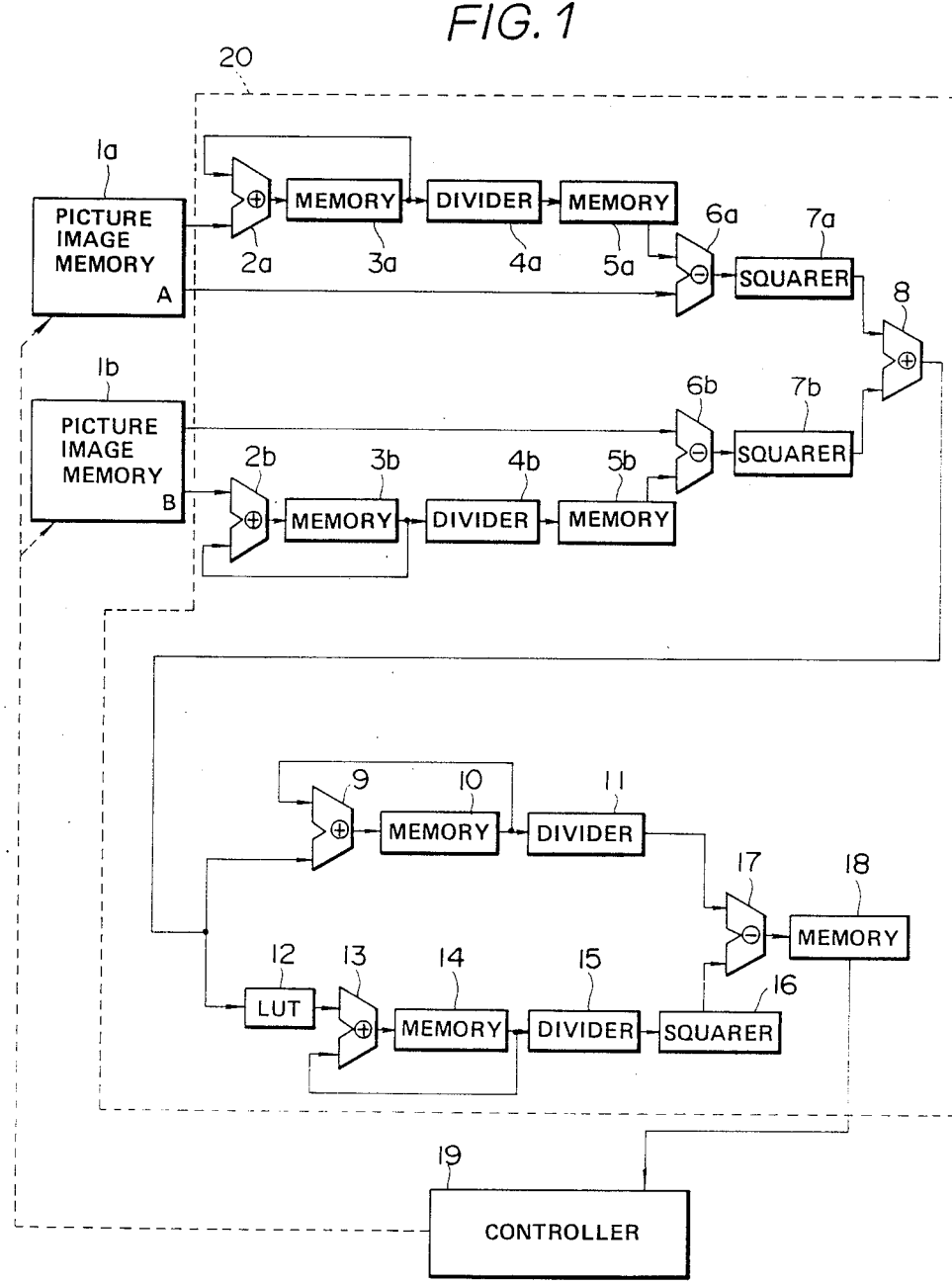
FIGS. 1 to 4 relate to the first embodiment of the present invention.

In FIG. 1, frames of different thick and thin picture images A and B are contained respectively in picture image memories 1a and 1b. Operation object regions X and Y are set by a controller 13 respectively within these thick and thin picture images A and B. The picture image signals of the respective set regions X and Y are delivered to adders 2a and 2b for the respective picture elements and the sum of the concentration values f and h of the picture image signals of the above mentioned set regions X and Y is calculated by these adders 2a and 2b and memories 3a and 3b. That is to say, the added values by the adders 2a and 2b are memorized respectively in the memories 3a and 3b. The values memorized in these memories 3a and 3b and the concentration values f and h of the picture image signals corresponding to the next picture elements of the set regions X and Y are added respectively by the adders 2a and 2b. Therefore, if added on all the picture elements of the set regions X and Y, the sum of the concentration values f and h will be finally memorized in the memories 3a and 3b.

The sums of these concentration values f and h are divided respectively by the numbers of the picture elements of the set regions X and Y by dividers 4a and 4b and the average concentration values $<f>$ and $<h>$ of the above mentioned set regions X and Y are calculated and are stored respectively in memories 5a and 5b.

The concentration values f and h of the picture image signals of the above mentioned set regions X and Y are delivered also to subtracters 6a and 6b for the respective picture elements, the above mentioned average concentration values $<f>$ and $<h>$ are subtracted by these subtracters 6a and 6b and the operation results $f-<f>$ and $h-<h>$ are squared respectively by squarers 7a and 7b formed of look-up table memories. The operation results obtained in the above mentioned squarers 7a and 7b are added by an adder 8 to obtain $$d^2 = (f - <f>)^2 + (h - <h>)^2.$$

Further, the operation result $d^2$ obtained in the aboe mentioned adder 8 is added on all the picture elements within the above mentioned set regions X and Y by an adder 9 and memory 10 and is divided by the number of the picture elements within the above mentioned set regions X and Y by a divider 11 to obtain an average $<d^2>$.

Also, on the other hand, an output $d^2$ from the above mentioned adder is delivered to a look-up table memory 12 and a square root d is obtained by this look-up table memory 12. The output d of this look-up table memory 12 is added on all the picture elements within the above mentioned set regions X and Y by the adder 13 and memory 14 and is divided by the number of the picture elements of the above mentioned set regions X and Y to obtain an average $<d>$ of d. This average $<d>$ of d is squared by a squarer 16.

The output $<d^2>$ of above mentioned divider 11 and the output $<d>^2$ of the above mentioned squarer 16 are subtracted by a subtracter 17 and the operation results are stored in a memory 18.

In this embodiment, a variance calculating means 20 is formed of the adders 2a and 2b to the subtracter 17. If the operation result obtained from the above mentioned subtracter 17 is represented by V, this V will be represented by $$V = <d^2> - <d>^2$$

which represents the variance of the operation result d until the above mentioned adder 8.

This variance V is compared in the size with the variance V of a different set of the set regions X and Y of the above mentioned picture images A and B by a controller 19 as a corresponding region detecting means. The set of the regions X and Y in which the above mentioned variance V is minimum is detected as corresponding regions.

Figure 4:
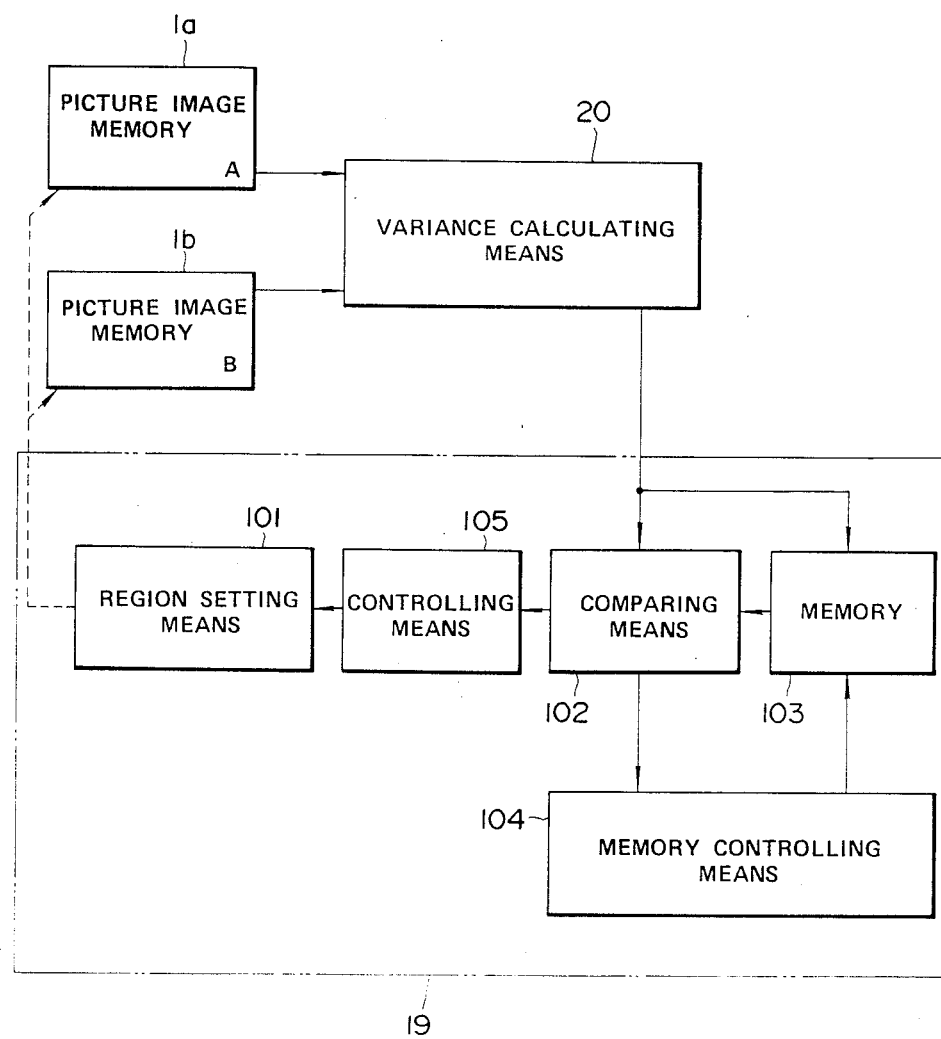

The above mentioned controller 19 is formed as shown, for example, in FIG. 4.

That is to say, the above mentioned controller 19 comprises a region setting means 101 for setting the operation object regions X and Y for the picture image memories 1a and 1b, a comparing means 102 for comparing the variance value V calculated by the variance calculating means 20 with a reference value $V_{min}$, a memory 103 capable of memorizing the above mentioned reference value $V_{min}$ and the address, for example, of the operation object region Y, a memory controlling means 104 for inputting the output of the above mentioned comparing means 102 and controlling the above mentioned memory 103 to memorize the above mentioned variance value V as a new reference value $V_{min}$ only in case the above mentioned variance value V is smaller than the above mentioned reference value $V_{min}$ and the address of the operation object region Y then as a new address and a controlling means 105 for comparing the above mentioned variance value V with the reference value $V_{min}$ by the above mentioned comparing means 102 to obtain the variance value V in a different combination of the operation object regions X and Y and then controlling the above mentioned region setting means 101 to change one Y of the above mentioned operation object regions X and Y.

The process of this embodiment shall be explained in the following with reference to FIGS. 2 and 3.

Figure 2:
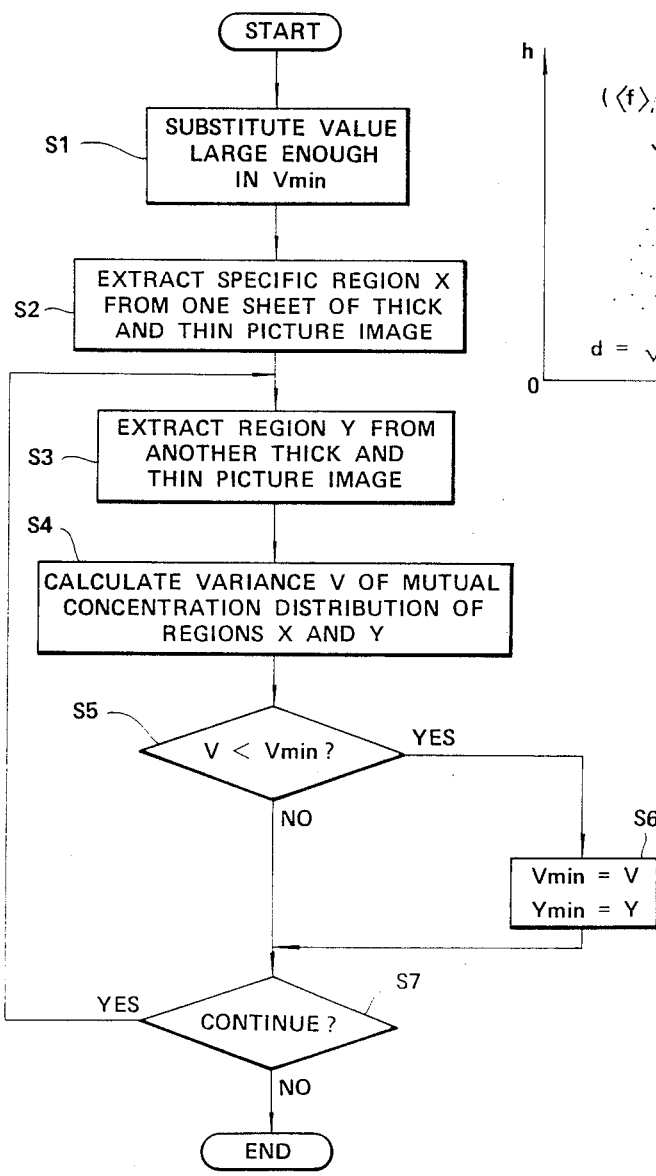
Figure 3:
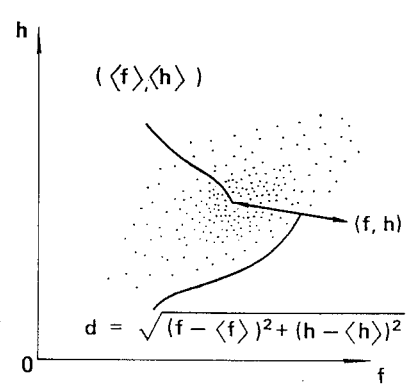

First of all, in the step S1 in FIG. 2, a value large enough as the reference value $V_{min}$ is substituted in the memory 103 of the controller 19.

Then, in the step S2, the specific set region X is extracted from one sheet of the thick and thin picture image A of a plurality of thick and thin picture images A and B stored respectively in the picture image memories 1a and 1b and, in the step S3, the set region Y is extracted to detect the region corresponding to the above mentioned specific set region X from the other sheet of the thick and thin picture image B.

Then, in the step S4, the variance V of the mutual concentration distributions of the regions X and Y is calculated by the variance calculating means 20. That is to say, first of all, by the operation process by the adders 2a and 2b and adder 8, $$d^2 = (f - <f>)^2 + (h - <h>)^2$$

is calculated from the concentration values f and h of the respective picture image signals of the above mentioned regions X and Y.

The significance of the above mentioned operation result $d^2$ shall be explained with reference to FIG. 3. FIG. 3 is a histogram (which shall be called two-dimensional histogram hereinafter) showing a mutual concentration distribution obtained by plotting as coordinate f, h the concentrations f and h in both picture images A and B of the picture elements located in the same positions within the respective set regions X and Y in a plane taking the concentration values of f and h on two axes intersecting at right angles with each other. In this two-dimensional histogram, the distance between the coordinate (f,h) of the mutual concentration value and the coordinate $(<f>,<h>)$ of the average of the concentration values is represented by $$d = \{(f - <f>)^2 + (h - <h>)^2\}^{\frac{1}{2}}.$$

Therefore, the operation by the abovementioned adders 2a and 2b to adder 8 is to determine the square $d^2$ of the distance d between the coordinate (f,h) of each mutual concentration value and the coordinate ($<f>,<h>$) of the average of the concentration values.

Then, $V = <d^2> - <d>^2$ is calculated by the operation process by the adder 9 and subtracter 17 from the output $d^2$ of the above mentioned adder 8 and is stored in the memory 18. This operation result V represents the variance of the distance d between the coordinate (f,h) of each mutual concentration value and the coordinate ($<f><h>$) of the average of the concentration values in the above mentioned two-dimensional histogram.

Then, in the step S5, the above mentioned variance value V is compared in the size with the reference value $V_{min}$ memorized in the memory 103 by the comparing means 102. Only in case the variance value V is smaller than the reference value $V_{min}$, in the step S6, by the memory controlling means 104, the above mentioned variance value V as a new reference value $V_{min}$ and the address of the operation object region Y then as a new address $Y_{min}$ are memorized in the memory 103.

Then, in the step S7, whether the process is to be continued or not is judged. In case it is to be continued, in the step S3, by the controlling means 105, the region X of the picture image A is made invariable and the region Y of the picture image B is changed. The process in and after the step S3 is made.

Thus, when the process in and after the step S3 is repeated while making the region X of the picture image A invariable and varying the region Y of the picture image B, finally, the minimum value of the variance V as a reference value $V_{min}$ and the address of the region Y in which the variance V is minimum as an address $Y_{min}$ will be memorized in the above mentioned memory 103.

Thus, by the controller 19, in the case that region X of the picture image A is made invariable and the region Y of the picture image B is varied, the sizes of the variances V of the sets of the respective regions X and Y are compared and the region Y in which this variance V is minimum is detected.

In case the regions X and Y set within the two picture images A and B are regions corresponding to each other, the expanse of the points (f,h) of the respective mutual concentration values in the above mentioned two-dimensional histogram will be smallest. Therefore, by detecting the set of regions in which the above mentioned variance V is minimum, the corresponding region can be detected.

Thus, according to this embodiment, in whatever form the manner of the mutual concentration distribution in the set regions X and Y in the above mentioned two-dimensional histogram is, the corresponding region can be detected by the simple means of calculating the variance of the distance d between the coordinate (f,h) of each mutual concentration value and the coordinate ($<f>,<h>$) of the average of the concentration values.

Figure 5:
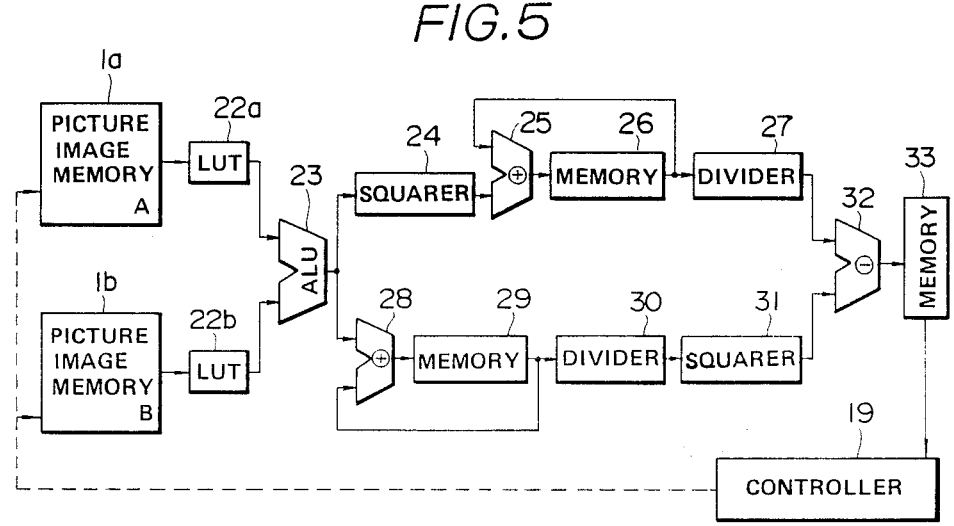
FIGS. 5 and 6 relate to the second embodiment of the present invention.
Figure 6:
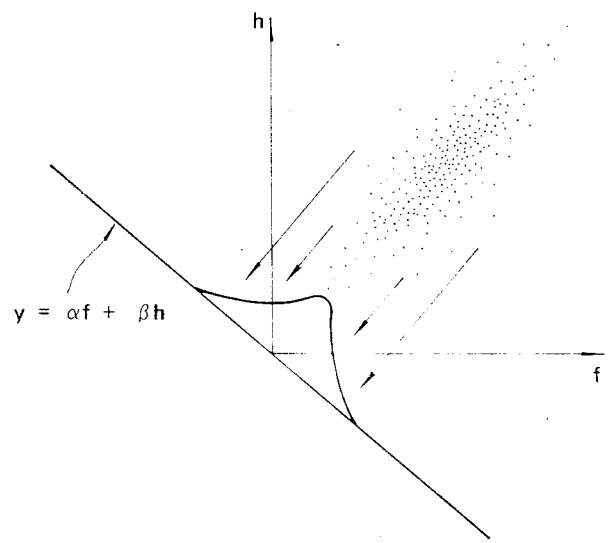

FIGS. 5 and 6 show the second embodiment of the present invention.

As shown in FIG. 5, in this embodiment, the picture image signals of the respective set regions X and Y of different thick and thin picture images A and B stored in the picture image memories 1a and 1b are delivered to look-up table memories 22a and 22b for the respective picture elements and, by these look-up table memories 22a and 22b, the respective concentration values f and h are multiplied by constants $\alpha$ and $\beta$ to be converted to $\alpha f$ and $\beta h$. The outputs $\alpha f$ and $\beta h$ from these look-up table memories 22a and 22b are added (or subtracted) by an operator 23 and $\alpha f + \beta h$ is operated.

The output $\alpha f + \beta h$ from the above mentioned operator 23 is squared by a squarer 24, is then added on all the picture elements within the above mentioned set regions X and Y by an adder 25 and memory 26, is further divided by the number of picture elements within the set regions X and Y by a divider 27 to operate the squared average $<(\alpha f + \beta h)^2>$ of $\alpha f + \beta h$.

On the other hand, the output $\alpha f + \beta h$ from the above mentioned operator 23 is input also into an adder 28, is added on all the picture elements within the above mentioned set regions X and Y by this adder 28 and a memory 29, is then divided by the number of the picture elements within the above mentioned set regions X and Y by a divider 30 and is further squared by a squarer 31 to operate the square of the average of $\alpha f + \beta h$.

The output $<(\alpha f + \beta h)^2>$ of the above mentioned divider 27 and the output $<\alpha f + \beta h>^2$ of the above mentioned squarer are subtracted by a subtracter 32. The operation result is stored in a memory 33.

If the operation result obtained from the above mentioned subtracter 32 is represented by V, this V will be represented by $$V = <(\alpha f + \beta h)^2> - <\alpha f + \beta h>^2$$

which represents the variance of $\alpha f + \beta h$.

The above process is repeated in the same manner as in the above mentioned first embodiment while making the region X of the picture image A invariable and varying the region Y of the picture image B, the variance V of the respective sets of the regions X and Y are compared in the size with each other and the region Y in which the variance V is minimum is detected.

Thus, in this embodiment, as shown in FIG. 6, in the two-dimensional histogram, the mutual concentration distribution is projected onto any straight line $y = \alpha f + \beta h$ and its variance V is calculated. By detecting the set of the regions X and Y in which the above mentioned variance V is minimum, the corresponding region can be detected.

By the way, when the straight line $y = \alpha f + \beta h$ on which the mutual concentration distribution is projected is set on a straight line intersecting at right angles with a direction (which shall be temporarily called a principal component direction) in which the concentration distribution is largest in the two-dimensional histogram, the effect will be largest.

Thus, according to this embodiment, in case the distribution of the mutual concentration values (f,h) in the above mentioned two-dimensional histogram is known, by setting a more effective straight line $y = \alpha f + \beta h$, by only making a simpler calculation, the corresponding region can be detected and the circuit formation for realizing it becomes simpler.

Figure 7:
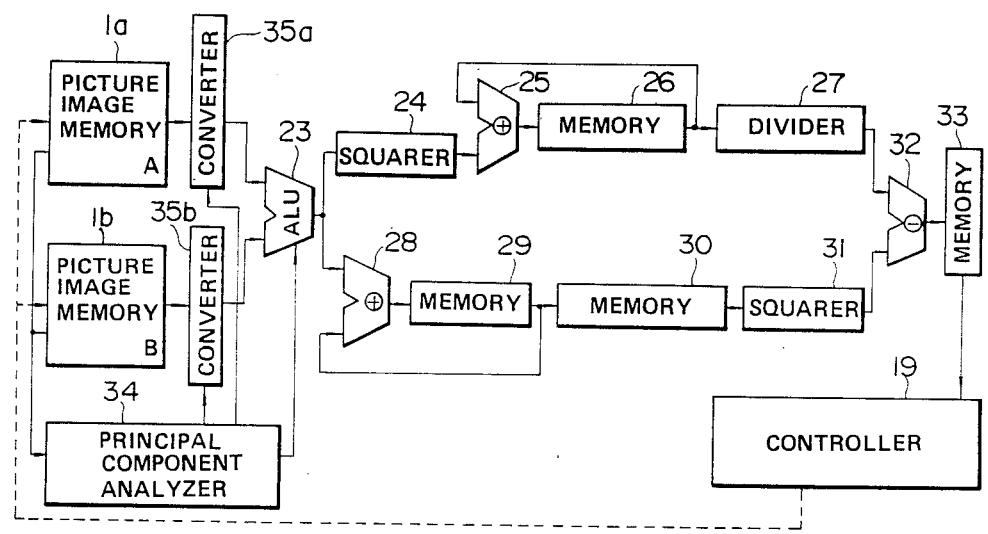
FIG. 7 is a formation diagram of a circuit realizing the third embodiment of the present invention.

FIG. 7 shows the third embodiment of the present invention.

In this embodiment, the principal component direction of the mutual concentration distribution of different thick and thin picture images A and B stored in the picture image memories 1a and 1b is detected by a principal component analyzer 34 so that a straight line $y = \alpha f + \beta h$ more effective to project a mutual concentration distribution may be thereby determined. The conversion coefficients α and β obtained by the above mentioned principal component analyzer 34 are delivered respectively to converters 35a and 35b formed of multipliers or look-up table memories. The picture image signals within the set regions X and Y of the above mentioned picture images A and B are delivered to the above mentioned converters 35a and 35b for the respective picture elements and the respective concentration values f and h are converted to αf and βh by these converters 35a and 35b.

Now, the above mentioned principal component analyzer 34 is formed as shown, for example, in FIG. 8.

That is to say, picture image signals A(r) and B(r) of the respective set regions of the thick and thin picture images A and B stored respectively in the above mentioned picture image memories 1a and 1b are input into a low-pass filter 201, have proper low spatial frequency regions extracted by this low-pass filter 201 and are then input into a covariance matrix operator 202. This covariance matrix operator 202 comprises a squarer, multiplier, adder and cummulative adder. Respective variance values $\sigma AA^2$, $\sigma BB^2$ and $\sigma AB^2$ are calculated on the two component values AL(r) and BL(r) of the above mentioned low spatial frequency regions.

Here, the covariance matrix V is defined as follows:

$$V = \begin{pmatrix} \sigma AA^2 & \sigma AB^2 \\ \sigma AB^2 & \sigma BB^2 \end{pmatrix} \quad (1)$$

$$= \begin{matrix} <AL^2> - <AL>^2 & <AL\ BL> - <AL><BL> \\ <AL\ BL> - <AL><BL> & <BL^2> - <BL>^2 \end{matrix}$$

wherein $<x> = \frac{1}{N}\sum_{r} x(r)$

N: Number of picture elements of the object picture image.

The element of the above mentioned covariance matrix is once recorded in a memory 203 and is then input first into an eigen value operator 204 to solve the eigen equation represented by the formula (2):

$$V\mathbb{A} = \gamma \mathbb{A} \quad (2)$$

wherein
A=(A1, A2)$^t$: Eigen vector.
γ: Eigen value.

The above mentioned eigen value operator 204 is a circuit for calculating only the maximum root of the equation (3) for determining the eigen value γ and comprises a multiplier, divider, adder and table converting memory:

$$|V - \gamma \mathbb{E}| = \begin{vmatrix} \sigma AA^2 - \gamma & \sigma AB^2 \\ \sigma AB^2 & \sigma BB^2 - \gamma \end{vmatrix} \quad (3)$$

$$= (\sigma AA^2 - \gamma)(\sigma BB^2 - \gamma) - AB^4 = 0.$$

Then, the above mentioned covariance matrix element recorded in the above mentioned memory 203 and the output γ from the above mentioned eigen value operator 204 are input into an eigen vector operator 205. The respective component values (n1 and n2) of the eigen vector n for the above mentioned eigen value represented by the formula (4) are calculated in this eigen vector operator 205. The first principal component is obtained as a compound variable having the element of the above mentioned eigen vector n as a coefficient.

From $(V - \gamma \mathbb{E})n = 0$, $$n1 = \frac{\sigma AB^2}{\sqrt{\sigma AB^4 + (\gamma - \sigma AA^2)^2}} \quad (4)$$

$$n2 = \frac{\gamma - \sigma AA^2}{\sqrt{\sigma AB^4 + (\gamma - \sigma AA^2)^2}}$$

The other formations and operations are the same as in the above mentioned second embodiment.

According to this embodiment, even in case the distribution of mutual concentration values (f and h) in the two-dimensional histogram is not known, the mutual concentration distribution will be able to be projected on the straight line $y = \alpha f + \beta h$ optimum to calculate the variance in response to the concentration distributions of two sheets of picture images A and B to be objects and the corresponding region will be able to be precisely detected.

Figure 9:
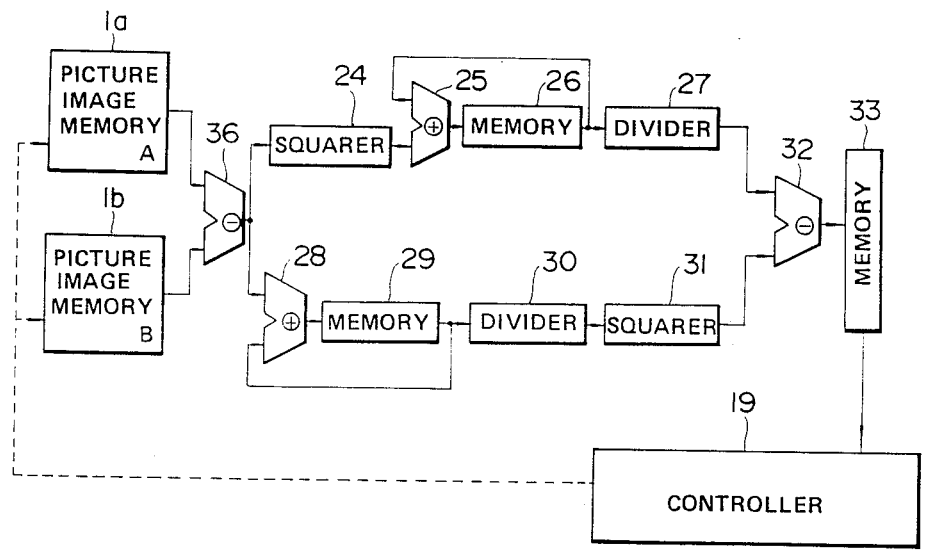
FIG. 9 is a formation diagram of a circuit realizing the fourth embodiment of the present invention.

FIG. 9 shows the fourth embodiment of the present invention.

In this embodiment, the concentration values f and h of the picture image signals of the respective set regions X and Y of different thick and thin picture images A and B stored in the picture image memories 1a and 1b are delivered to a subtracter 36 for the respective picture elements and the difference f−h of the concentration values is calculated by the subtracter 36.

By the operation by the same squarer 24 to subtracter 32 as in the first embodiment, the variance V of the output f−h from the above mentioned subtracter 36:

$$V = <(f-h)^2> - <f-h>^2$$

is calculated.

The above process is repeated in the same manner as in the above mentioned first embodiment while making the region X of the picture image A invariable and varying the region Y of the picture image B, the variances V of the respective sets of the regions X and Y are compared in the size with each other and the region Y in which the variance V is minimum is detected.

Thus, in this embodiment, in the above mentioned two-dimensional histogram, the mutual concentration distribution is projected on a straight line $y = f - h$, the variance V is calculated and the corresponding region is detected by detecting the set of the regions X and Y in which the variance V is minimum.

Generally, in most cases, the distribution of the mutual concentration value (f,h) is largest in the (1,1) direction in the two-dimensional histogram of two sheets of thick and thin picture images A and B which are objects. Therefore, by calculating the variance V by projecting the concentration distribution in the (1, −1) direction intersecting at right angles with the (1, 1) direction, that is, on the straight line $y = f - h$, the corresponding region can be detected.

According to this embodiment, by a simpler calculation and a circuit formation realizing it, the corresponding region can be detected at a precision close to that in the above mentioned second and third embodiments.

Figure 10:
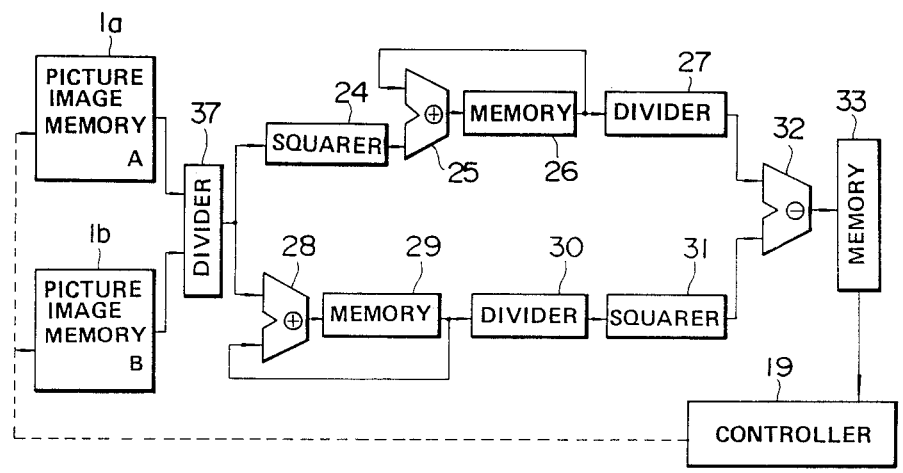
FIGS. 10 and 11 relate to the fifth embodiment of the present invention.
Figure 11:
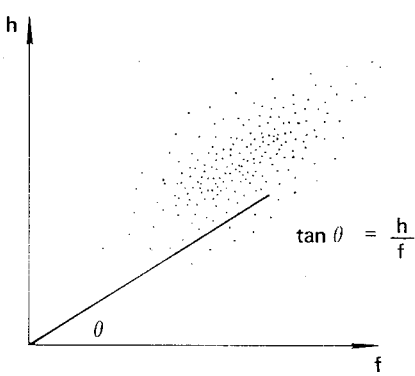

FIGS. 10 and 11 show the fifth embodiment of the present invention.

As shown in FIG. 10, in this embodiment, the picture image signals of the respective set regions X and Y of different thick and thin picture images A and B stored in the picture image memories 1a and 1b are delivered to a divider 37 for the respective picture elements and h/f (or f/h) is calculated by this divider 37.

By the operation by the squarer 24 to the subtracter 32 the same as in the first embodiment, the variance V of the output h/f from the above mentioned divider 37:

$$V = \langle (h/f)^2 \rangle - \langle h/f \rangle^2$$

is calculated.

The same as in the first embodiment, by detecting the set of the regions X and Y in which the above mentioned variance V is minimum, the corresponding region is detedted.

As shown in FIG. 11, in the two-dimensional histogram, if the gradient from the f axis of the mutual concentration value (f,h) is represented by $\theta$, by calculating the variance V of $\tan \theta = h/f$ representing this gradient, the corresponding region is detected in this embodiment.

According to this embodiment, the corresponding region can be detected by a simpler calculation and a circuit formation realizing it.

Figure 12:
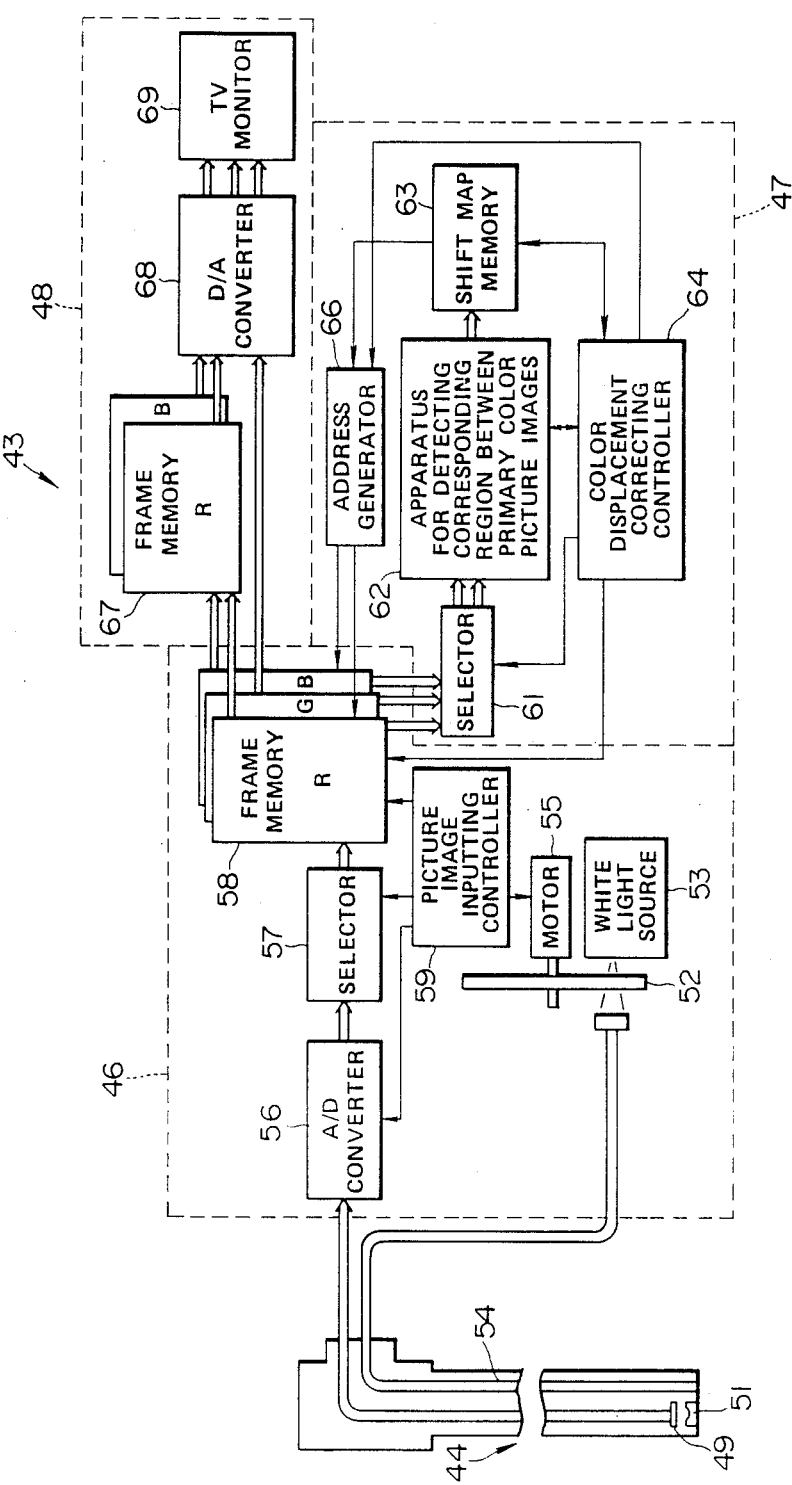
Figure 13:
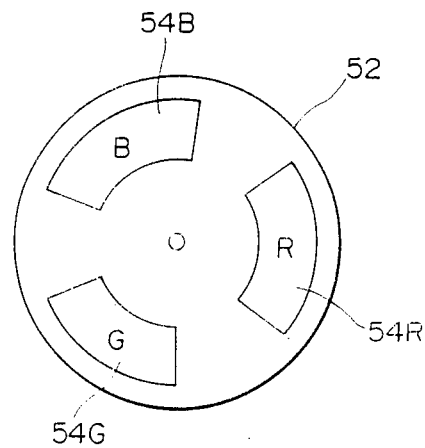

FIGS. 12 to 14 show the sixth embodiment.

In the sixth embodiment of the present invention, the apparatus for detecting corresponding regions between picture images shown in the first to fifth embodiments is applied to an apparatus for correcting color displacements of electronic endoscope picture images by a field sequential system.

FIG. 11 shows the formation of this embodiment. An electronic endoscope apparatus 43 is formed as largely divided of an endoscope 44, picture image input apparatus 46, color displacement correcting apparatus 47 and picture image displaying apparatus 48.

Such monochromatic solid state imaging device 49 as a charge coupled device (CCD) is provided at the tip of the above mentioned endoscope 44 so that a picture image formed by an objective lens 51 may be formed on the imaging plane. An illuminating light is emitted from such white light source 53 as a xenon lamp within the above mentioned picture image input apparatus 46, passes through a rotary filter 52 and is then radiated from the tip of the insertable part through a light guide 54 formed of an optical fiber bundle and inserted through the above mentioned endoscope 44.

Here, as shown in FIG. 12, the above mentioned rotary filter 52 is disc-like and has color passing filters 54R, 54G and 54B made to respectively pass spectra of red(R), green(G) and blue(B) arranged in the peripheral direction. When the above mentioned rotary filter 52 is driven at a rate of one rotation per 1/30 second by a motor 55 within the above mentioned picture image input apparatus 46, the white light will be converted to the color lights of R, G and B in the time order and the above mentioned solid state imaging device 49 will be able to take a monochromatic picture image of an object eradiated with the color lights of R, G and B.

The picture image signal from the above mentioned solid state imaging device 49 is converted to a digital signal by an A/D converter 56 within the above mentioned picture image input apparatus 46 and is stored in a predetermined color region within a frame memory 58 by a selector 57.

A picture image input controller 59 provided within the above mentioned picture image input apparatus 46 is connected to the A/D converter 56, selector 57, frame memory 58 and motor 55 and controls the picture image signal of the object eradiated with the color lights of R, G and B so as to be able to be stored in the respective frame memories 58.

The respective primary color picture images thus gradually accumulated in the above mentioned frame memories 58 are input into a selector 61 within the above mentioned color displacement correcting apparatus 47 and the R picture image and G picture image or the G picture image and B picture image among the R, G and B primary color picture images are selected by the color displacement correcting controller 64.

The output from the above mentioned selector 61 is input into an apparatus 62 for detecting corresponding regions between primary color picture images formed of the apparatus for detecting the corresponding regions between picture images mentioned in the first to fifth embodiments and the displacement of the R picture image or B picture image for the G picture image is detected and is recorded as a shift 76 in a shift map memory 63.

The above mentioned color displacement detecting operation is controlled by a color displacement correcting controller 64 provided within the color displacement correcting apparatus 47.

Then, in an address generator 66, on the basis of the shift amount 76 recorded in the above mentioned shift map memory 63, a correcting address correcting the R and B picture images is generated and is sent to the above mentioned frame memory 58.

The above mentioned frame memory 58 is to output a picture image signal of R or B based on the above mentioned correcting address to the frame memory 67 within the above mentioned picture image displaying device 48 by the instruction of the color displacement correcting controller 64. The G signal in the above mentioned frame memory 58 and R and B signals in the above mentioned frame memory 67 are input into a D/A converter 68, are converted to analogue signals and are then displayed as color picture images by a TV monitor 69.

In this embodiment, the color displacement of the R picture image and color displacement of the B picture image are successively corrected by a set of color displacement correcting devices 47. However, two sets of color displacement correcting devices for the R picture image and B picture image can be provided and connected in parallel to reduce the processing time.

Now, generally, in the field sequential system electronic endoscope, as described above, the illuminating light is changed to R, G and B color lights within 1/30 second, the thick and thin picture images of the respective colors are successively input and the three primary color picture images are simultaneously output and displayed to thereby display the color picture images. However, in this system, in case the movement of the object or the endoscope itself is fast, the relative positions of the endoscope and object when the respective primary color picture images are imaged will be different, the reproduced picture image will be fogged or a colored edge will appear and a so-called color displacement will occur. In this embodiment, in order to correct such color displacement, the apparatus 62 for detecting corresponding regions between primary color images shown in the first to fifth embodiments is used to detect the corresponding resion between the primary color picture images.

Figures 14A, 14B:
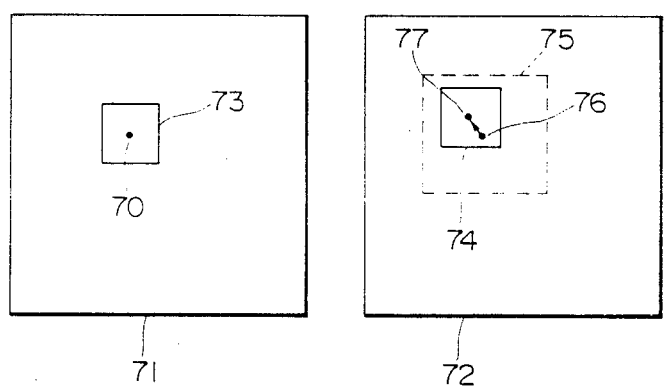
FIG. 14(a) is an explanatory view of a G picture image.
FIG. 14(b) is an explanatory view of an R or B picture image.

In FIGS. 14(a) and 14(b), the color displacement of the digital picture image stored in the above mentioned frame memory 58 is corrected by such input method as is described above.

In the above mentioned apparatus 62 for detecting corresponding regions between primary color images, the shift 76 of the R picture image and B picture image is determined for the respective picture elements with the G picture image 71 of the three R, G and B primary color picture images as a reference. That is to say, a small region 74 of the same size is set within an R or B picture image 72 for each small region 73 set with each picture element 70 of the G picture image to be a reference as a center, the variance V of the mutual concentration distribution is calculated while moving the position of the small region 74 within a certain range 75, the set of the small region 73 of the G picture image 71 and the small region 74 of the R picture image or B picture image 72 in which the variance V is minimum is determined and the shift amount 76 then is output in the shift map memory 63.

The P and B picture images 72 are re-formed on the basis of the thus determined shift amount 76 in each picture element 77 of the R and B picture images 72 and the color picture image corrected in the color displacement is output and displayed.

By the way, the shift amount 76 in each picture element 77 of the R and B picture images 72 is determined by such method as is described above on all the picture elements. However, the calculation amount may be reduced by a method wherein the shift amount is determined on the representative picture elements selected at fixed intervals and the shift amount is presumed by using a compensating method from those representative picture elements on the other picture elements.

According to this embodiment, a circuit of correcting the color displacement in the field sequential system electronic endoscope picture image within a short processing time can be realized by a comparatively simple circuit formation.

Figure 15:
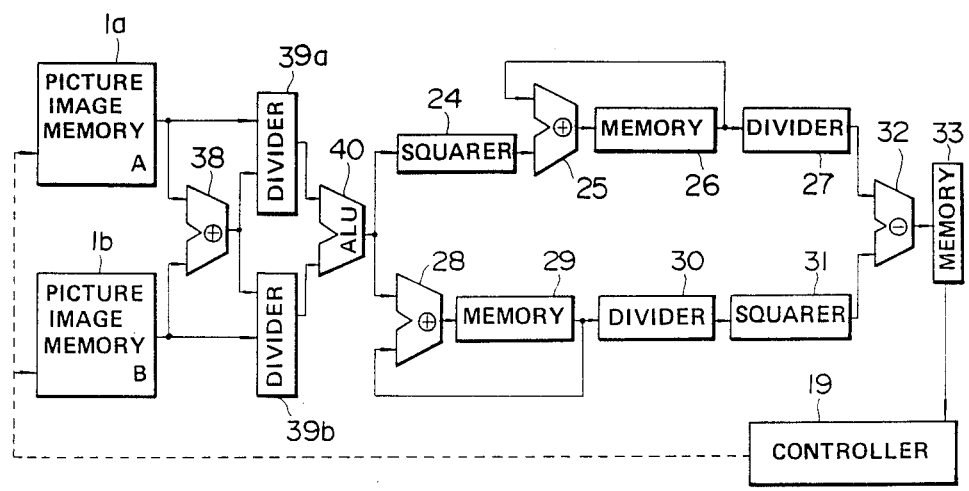
FIGS. 15 and 16 relate to the seventh embodiment of the present invention.
Figure 16:
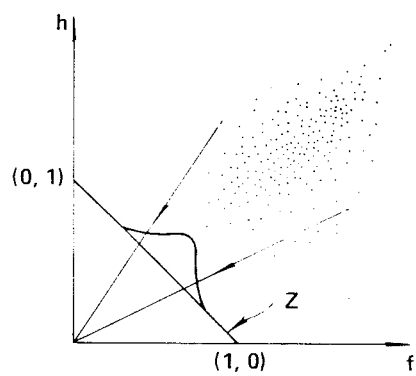

FIGS. 15 and 16 show the seventh embodiment of the present invention.

As shown in FIG. 15, in this embodiment, the picture image signals of the respective set regions X and Y of different thick and thin picture images A and B stored in the picture image memories 1a and 1b are delivered to the adder 38 for the respective picture elements and f+h is calculated by this adder 38.

The concentration values f and h of the picture image signals of the above mentioned set regions X and Y are delivered also to the dividers 39a and 39b for the respective picture elements, are divided by the output f+h from the above mentioned adder 38 by these dividers 39a and 39b and are standardized to $f'=f/(f+h)$ and $h'=h/(f+h)$. The outputs f' and h' from these dividers 39a and 39b are subtracted by the subtracter 40 to obtain $f'-h'$.

By the operation by the same squarer 24 to subtracter 32 as in the first embodiment, the variance V of the output $f'-h'$ from the above mentioned subtracter:

$$V = <(f'-h')^2> - <f'-h'>^2$$

The same as in the first embodiment, by detecting the set of the regions X and Y in which the above mentioned variance V is minimum, the corresponding region is detected.

Thus, in this embodiment, the concentration values f and h for the respective picture elements of the set regions X and Y of the thick and thin picture images A and B are divided by the sum f+h of these concentration values and are standardized to f' and h'. Dividing the above mentioned concentration values f and h by the sum f+h of the concentration values is to convert the resepective mutual concentration values (f and h) to the points (f',h') projected from the respective points (f,h) toward the origin (0,0) onto the straight line Z connecting (1,0) and (0,1) in the two-dimensional histogram as shown in FIG. 16. The variance V of the points (f',h') after the conversion is calculated.

For example, if the above mentioned thick and thin picture images A and B are considered to be original picture images of the respctive dimensions of the picture images formed of two-dimensions, the sum f+h of the above mentioned concentration values will be able to be considered to represent the brightness of the two-dimensional picture image. Therefore, when the above mentioned concentration values f and h are divided by f+h representing the brightness and are standardized, such influence on the brightness as of the illumination fluctuation and shadow which is a factor of reducing the precision in calculating the variance will be able to be reduced and the precision of the detection of the correspoding region will be able to be elevated.

Figure 17:
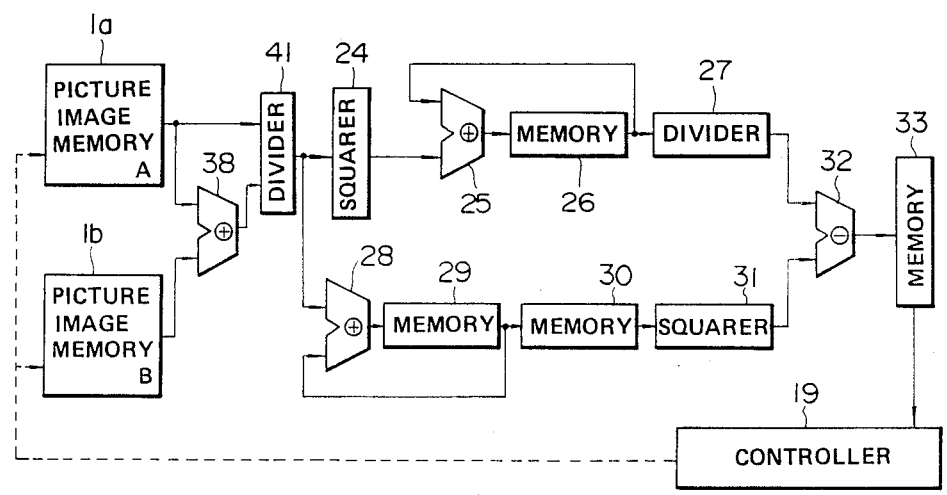
FIG. 17 is a formation diagram of a circuit realizing this embodiment.
Figure 18:
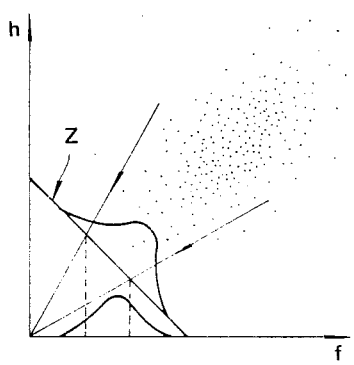
FIG. 18 is an explanatory diagram showing the mutual concentration distribution.

FIGS. 17 and 18 show the eighth embodiment of the present invention.

As shown in FIG. 17, in this embodiment, the picture image signals of the respective set regions X and Y of different thick and thin picture images A and B stored in the picture image memories 1a and 1b are delivered for the respective picture elements to the adder 38 and f+h is calculated by this adder 38.

The concentration value f of the picture image signal of the above mentioned set region X is delivered for the respective picture elements also to the divider 41, is then divided by the output f+h from the above mentioned adder 38 by this divider 41 and is standardized to $f'=f/(f+h)$.

By the operation by the squarer 24 to subtracter 32 the same as in the first embodiment, the varience V of the output f' from the above mentioned divider 41:

$$V = <f'^2> - <f'>^2$$

is calculated.

The same as in the first embodiment, by detecting the set of the regions X and Y in which the above mentioned variance V is minimum, the corresponding region is detected.

In this embodiment, as shown in FIG. 18, in the two-dimensional histogram, the same as in the above mentioned seventh embodiment, each mutual concentration value (f,h) is converted to the point (f',g') toward the origin (0,0) onto the straight line Z connecting (1,0) and (0,1) and the variance of the f axis component of the distribution of this point (f',g') is calculated.

According to this embodiment, the same as in the above mentioned seventh embodiment, such influence on the brightness as the illumination fluctuation and shadow can be reduced, the precision can be elevated and the calculation and the circuit formation realizing it can be made simpler.

By the way, the present invention can be applied not only to the case of detecting the corresponding regions between a plurality of picture images correlated with the form distribution in the actual field but also, for example, to detecting whether a specific object is present in the picture image or not and in what position of the picture image the specific object is located in case it is present.

As explained above, according to the present invention, as the corresponding region can be detected by calculating the variance of the mutual concentration distribution in the operation object regions of a plurality of picture images, there is an effect that the corresponding region can be simply detected by the simpler calculation and the circuit formation realizing it.

In this invention, it is apparent that working modes different in a wide range can be formed on the basis of this invention without departing from the spirit and scope of the invention. This invention shall not be restricted by its specific working mode except being limited by the appended claims.

What is claimed is:

1. A method for detecting corresponding regions between a plurality of picture images stored within a memory means, comprising respective steps of:
    setting respective operation object regions for a pluarlity of picture images stored within said memory means;
    detecting mutual picture image concentration distributions in operation object regions for said picture images;
    calculating a variance of the mutual picture image concentration distributions in said operation object regions; and thereafter
    detecting the operation object regions for said picture images which have been set in which the calculated variance value is at a minimum to thereby detect the corresponding regions between the plurality of picture images, whereby image precision is increased and processing time is reduced.

2. A method for detecting corresponding operation object regions between a plurality of picture images correlated with a form distribution in an actual field, comprising respective steps of:
    memorizing a plurality of picture images in a picture image memorizing means;
    setting the operation object regions for the respective picture images which have been memorized in said picture image memorizing means; p1 detecting mutual picture image concentration distributions in operation object regions for said picture images;
    calculating a variance of the mutual picture image concentration distributions in the operation object regions of the respective picture images; and thereafter
    comparing respective variance values in a plurality of sets of operation object regions of said picture images obtained by changing one of said operation object regions and detecting a set of operation object regions wherein the variance value is at a minimum to thereby detect the corresponding operation regions between the plurality of picture images, whereby image precision is increased and processing time is reduced.

3. A method according to claim 1 or 2 wherein said step of calculating the variance of the mutual concentration distributions in said operation object regions includes calculating the variance of the distance between the coordinate of each mutual concentraion value and the coordinate of the average of the concentration values in a histogram in which the respective concentration of picture elements located in the same positions of the respective operation object regions are made variables.

4. A method according to claim 1 or 2 wherein said step of calculating the variance of the mutual concentration distributions in said operation object regions includes projecting the distrubution of the mutual concentration values onto any straight line and calculating the variance of the distribution of the concentration values projected onto said straight line in a histgram in which the respective concentrations of the picture elements located in same positions of the operation object regions of two picture images are made variables.

5. A method acccording to claim 1 or 2 wherein said step of calculating the variance of the mutual concentration distributions in said operation object regions includes multiplying by a fixed number and adding the respective concentrations of the picture images located in same positions of the operation object regions of two picture images and calculating the variance of the distribution of this added value.

6. A method according to claim 1 or 2 wherein said step of calculating the variance of the mutual concentration distributions in said operation object regions inclues projecting the distribution of mutual concentration values onto a straight line intersecting at right angles with the principal component direction of the distribution of the mutual concentration values and calculating the variance of the distribution of the concentration values projected on said straight line in a histogram in which respective concentrations of the picture elements located in same positions of the operation object regions of two picture images are made variables.

7. A method according to claim 1 or 2 wherein said step of calculating the variance of the mutual concentration distributions in said operation object regions includes detecting principal component direction of the distribution of the mutual concentration values, projecting the distribution of the mutual concentration values onto a straight line intersecting at right angles with said principal component direction and calculating the variance of the distribution of the concentration values projected on straight line in a histogram in which the respective concentration of the picture elements located in same positions of the operation object regions of two picture images are made variables.

8. A method according to claim 1 or 2 wherein said step of calculating the variance of the mutual concentration distributions in said operation object regions inclues projecting the distribution of the mutual concentration values onto a straight line in the $(1, -1)$ direction and calculating the variance of the distribution of the concentration values projected on straight line in a histogram in which the respective concentrations of the picture elements located in the same positions of the operation object regions of two picture images are made variables.

9. a method according to claim 1 or 2 wherein said step of calculating the variance of the mutual concentration distributions in said operation object regions includes calculating the variance of the distributions of differences of the respective concentrations of picture elements located in same positions of the operation object regions of two picture images.

10. A method according to claim 1 or 2 wherein said step of calculating the variance of the mutual concentration distributions in said operation object regions includes calculating the variance of the distribution of quantities representing gradients from one coordinate axis of coordinates of the respective mutual concentration values in a histogram in which the respective concentrations of picture elements located in same positions of the operation object regions of two picture images are made variables.

11. A method according to claim 1 or 2 wherein said step of calculating the variance of mutual concentration distributions in said operation object regions includes calculating the variance of the distribution of the ratio of the concentrations of picture elements located in same positions of the operation object regions of two picture elements.

12. A method according to claim 1 or 2 wherein said step of calculating the variance of the mutual concentration distributions in said operation object regions includes projecting the distribution of the mutual concentration values toward an origin (0,0) onto a straight line connecting the points (1,0) and (0,1) and calculating the variance of the distribution of the concentration values projected onto a straight line in a histogram in which the respective concentrations of the picture elements located in the same position of the operation object regions of two picture images are represented by variables of two axes intersecting at right angles with each other in said histogram and a frequency is represented by the respective concentrations.

13. A method according to claim 1 or 2 wherein said step of calculating the variance of the mutual concentration distribution in said operation object regions includes dividing by a sum of the respective concentration values and standardizing the respective concentrations of the picture elements located in same positions of the operation object regions of two picture images and calculating the variance of the distribution of the differences of a standardized respective concentration values.

14. A method according to claim 1 or 2 wherein said step of calculating the variance of the mutual concentration distributions in said operation object regions includes projecting the distribution of the mutual concentration values toward an origin (0,0) onto a straight line connecting points (1,0) and (0,1) and calculating the variance of one coordinate axis component of the distribution of the concentration values projected onto a straight line in a histogram in which the respective concentration of picture elements located in same positions of the operative object regions of two picture images are represented by variables of two axes intersecting at right angles with each other in said histogram and a frequency is represented by the respective concentrations.

15. A method according to claim 1 or 2 wherein said step of calculating the variance of the mutual concentration distributions in said operation object regions includes dividing by a sum of the respective concentration values of the picture elements located in the same positions of the operation object regions of two picture images and standardizing the concentration values of the respective picture elements of one region of the operation object regions of two picture images and calculating the variance of the distribution of a standardized concentration values.

16. A method for correcting a color displacement of electronic endoscope picture images by a field sequential system, comprising respective steps of:
setting respective operation object regions for two picture images of three primary color picture images;
detecting mutual picture image concentration distributions in operation object regions;
calculating a variance of the mutual picture image concentration distributions in said operation object regions;
detecting a set of the operation object regions wherein said calculated variance value is at a minimum;
detecting a displacement between the operation object regions wherein the variance value is at a minimum; and thereafter
correcting an address of one of said picture images on the basis of said displacement.

17. An electronic endoscope apparatus of a field sequential system, comprising:
an endoscope having an illuminating means for radiating lights of different colors onto an object to be imaged and an imaging means for imaging said object corresponding to the illuminating lights of respective colors by said illuminating means;
a first memorizing means operably connected to said imaging means for memorizing picture images of respective colors imaged by said imaging means;
a selecting means operably connected to said first memorizing means for selecting two picture images from among the picture images of the respective colors memorized in said first memorizing means;
a region setting means operably connected to said selecting means for setting respective operation object regions for the two picture images selected by said selecting means;
a detecting means for detecting mutual picture image concentration distributions in operation object regions;
a variance calculating means operably connected to said region setting means for calculating a variance of the mutual concentration picture image distribution in the operation object regions set by said region setting means;
a corresponding region detecting means operably connected to said variance calculating means for detecting a set of regions where the variance value calculated by said variance calculating means is at a minimum;
a detecting means operably connected to said corresponding detecting means for detecting the displacement between the regions where the variance value detected by said corresponding region detecting means is at a minimum;
an address correcting means operably connected to said detecting means for correcting an address of one of said two picture images on the basis of the displacement detected by said detecting means;
a second memorizing means operably connected to said address correcting means for memorizing the picture image having had the address corrected by said address correcting means; and
a signal processing means operably connected to said first and second memorizing means for reading the picture image having had the address corrected out of said second memorizing means, and for reading the picture image having an uncorrected address out of said first memorizing means, and for forming a video signal after having had the color displacement corrected.

18. An apparatus for detecting corresponding regions between picture images, comprising:
    a region setting means for setting operation object regions for each of a plurality of picture images within a memory means;
    means for detecting mutual picture image concentration distributions in operation object regions of said picture images;
    a variance calculating means for calculating a variance of the mutual picture image concentration distributions in the operation object regions of a plurality of picture images; and
    a corresponding region detecting means operably connected to said variance calculating means for detecting a set of regions where a variance value calculated by said variance calculating means is at a minimum to thereby detect the corresponding regions between the picture images, whereby image precision is increased and processing time is reduced.

19. An apparatus for detecting corresponding regions between picture images, comprising:
    a picture image memorizing means for memorizing a plurality of picture images;
    a region setting means for setting operation object regions for respective picture images memorized by said picture image memorizing means;
    a detecting means for detecting mutual picture image concentration distribution in operation object regions;
    a variance calculating means for calculating a variance of the mutual picture image concentration distributions in the operation object regions of the respective picture images set by said region setting means;
    a comparing means operably connected to said variance calculating means for comparing the variance value calculated by said variance calculating means with a reference value;
    a memorizing means operably connected to said comparing means for memorizing said reference value and an address of the operation object region;
    a memory controlling means operably connected to said comparing means for controlling said memorizing means to memorize said variance value as a new reference value only in case an output of said comparing means is input, and said variance value is smaller than said reference value, and the address of the operation object region then becomes a new address upon said variance value being smaller than said reference value; and
    controlling means operably connected to said memorizing means and said memory controlling means for controlling said region setting means to change one of said operation object regions, after comparing said variance value and reference value with each other by said comparing means, in order to obtain a variance value in a different combination of operation object regions.

20. An apparatus according to claim 18 or 19 wherein said variance calculating means includes a calculating means for calculating the variance of a distance between the coordinate of each mutual concentration value and a coordinate of an average of the concentration values in a histogram in which respective concentrations of picture elements located in same positions of the respective operation object regions are made variables.

21. An apparatus according to claim 18 or 19 wherein said variance calculating means comprises:
    a first calculating means for calculating a square of a deviation between the concentration of each picture element and an average value of the concentrations of picture elements on each operation object region;
    a second calculating means for adding calculation results of a first calculating means of both operation object regions for respective picture elements in same positions of both operation object regions; and
    a third calculating means for calculating the variance of a square root of a calculation result of a second calculating means.

22. An apparatus according to claim 21 wherein said third calculating means comprises a fourth calculating means for calculating an average value of the calculation results of said second calculating means, a fifth calculating means for calculating the square of an average of square roots of said second calculation results and a sixth calculating means for subtracting a fifth calculation result from said fourth calculation result and calculating the variance of the square roots of the calculation results of said second calculating means.

23. An apparatus according to claim 18 or 19 wherein said variance calculating means includes a calculating means for calculating the variance of the distribution of the mutual concentration values projected on any straight line in a histogram in which the respective concentrations of picture elements located in same positions of the operation object regions of two picture images are made variables.

24. An apparatus according to claim 23 wherein said calculating means comprises a calculating means for multiplying by a fixed number and adding the respective concentrations of the picture elements located in the same positions of the operation object regions of two picture images and a calculating means for calculating the variance of the distribution of the values added by said calculating means.

25. An apparatus according to claim 18 or 19 wherein said variance calculating means comprises a calculating means for calculating the variance of the distribution of the mutual concentration values projected onto a straight line intersecting at right angles with a principal component direction of the distribution of the mutual concentration values in a histogram in which the respective concentrations of picture elements located in same positions of the operation object regions of two picture images are made variables.

26. An apparatus according to claim 25 wherein said calculating means comprises a principal component analyzing means for detecting the principal component direction of the distribution of the mutual concentration values, a calculating means for multiplying by a fixed number determined on a basis of the principal component direction detected by said principal component analyzing means and adding the respective concentrations of the picture elements located in the same positions of the operation object regions of two picture images and a calculating means for calculating the variance of the distribution of the values added by said calculating means in a histogram in which the respective concentrations of the picture elements located in the same positions of the operation object regions of two picture images are made variables.

27. An apparatus according to claim 18 or 19 wherein said variance calculating means comprises a calculating means for calculating the variance of the distribution of the mutual concentration values projected onto a straight line in a (1, −1) direction in a histogram in which the respective concentrations of the picture elements located in same positions of the operation object regions of two picture images are made variables.

28. An apparatus according to claim 27 wherein said calculating means comprises a calculating means for calculating the difference of the respective concentrations of the picture elements located in the same positions of the operation object regions of two picture images and a calculating means for calculating the variance of the distribution of differences of the respective concentrations.

29. An apparatus according to claim 18 or 19 wherein said variance calculating means comprises a calculating means for calculating the variance of the distribution of the quantities representing gradients from one coordinate axis of coordinates of the respective mutual concentration values in a histogram in which the respective concentrations of picture elements located in same positions of the operation object regions of picture images are made variables.

30. An apparatus according to claim 29 wherein said calculating means comprises a calculating means for calculating the ratios of the concentrations of the picture elements located in the same positions of the operation object regions of two picture images and a calculating means for calculating the variance of the distribution of ratios.

31. An apparatus according to claim 18 or 19 wherein said variance calculating means comprises a calculating means for calculating the variance of the distribution of the mutual concentration values projected onto a straight line connecting points (1,0) and (0,1) toward an origin (0,0) in a histogram in which the respective concentrations of picture elements located in same positions of the operation object regions of two picture images are represented by variables of two axes intersecting at right angles with each other in said histogram and a frequency is represented by the respective concentrations.

32. An apparatus according to claim 31 wherein said calculating means comprises a calculating means for dividing by a sum of the respective concentration values and standardizing the respective concentrations of the picture elements located in the same positions of the operation object regions of two picture images and a calculating means for calculating the variance of the distribution of differences of the respective standardized concentration values.

33. An apparatus according to claim 18 or 19 wherein said variance calculating means comprises a calculating means for calculating the variance of one coordinate axis component of the distribution of the mutual concentration values projected onto a straight line connecting the points (1,0) and (0,1) toward an origin (0,0) in a histogram in which the respective concentrations of the picture elements located in same positions of the operation object regions of two picture images are represented by variables of two axes intersecting at right angles with each other in said histogram and a frequency is represented by the respective concentrations.

34. An apparatus according to claim 33 wherein said calculating means comprises a calculating means for dividing by a sum of the respective concentration values of the picture elements located in the same positions of the operation object regions of two picture images and standardizing the respective concentration values of the respective picture elements of one region of the operation object regions of two picture images and a calculating means for calculating the variance of the distribution of said standardized concentration values.

35. A method for correcting a color displacement of electronic endoscope picture images by a field sequential system, comprising respective steps of:
setting a first operation object region with a picture elements as a center for each picture element for one picture image of three primary color picture images;
setting a second operation object regions for detecting an operation object region corresponding to said first operation object region for two other picture images of the three primary color picture images;
detecting mutual picture image concentration distributions;
calculating a variance of mutual concentration distributions in said first and second operation object regions;
comparing respective variance values in a plurality of sets of operation object regions obtained by changing said second operation object region and detecting a set of regions in which the variance value is at a minimum;
detecting a displacement between operation object regions where the variance value is at a minimum; and thereafter
correcting an address of a picture element in a center of said second operation object region when the variance value is at a minimum on the basis of said displacement.

36. An apparatus for correcting color displacements of electronic endoscope picture images by a field sequential system, comprising:
a selecting means for selecting two picture images from among three primary color picture images;
a region setting means for setting a first operation object region with the picture element as a center for each picture element for one picture image of the picture images selected by said selecting means, and setting a second operation object region for detecting an operation object region corresponding to said first operation object region for the other picture image;
means for detecting mutual picture image concentration distributions;
a variance calculating means for calculating variances of mutual concentration distributions in the first and second operation object regions set by said region setting means;
a corresponding region detecting means for comparing respective variance values in a plurality of sets of operation object regions obtained by changing the second operation object region by said operation object region setting means and detecting a set of regions in which the variance value is at a minimum;
a detecting means for detecting a displacement between regions where the variance value detected by said corresponding region detecting means is at a minimum;

a memorizing means for memorizing said displacement detected by said detecting means; and an address correcting means for correcting an address of the picture element in the center of the second operation object region when the variance value is at a minimum on the basis of the displacement memorized in said memorizing means.

* * * * *